United States Patent
Reese

[15] 3,669,143
[45] June 13, 1972

[54] FLOW STABILIZER FOR PILOT-OPERATED MODULATING VALVE SYSTEM

[72] Inventor: James R. Reese, Santa Ana, Calif.
[73] Assignee: Cal-Val Co., Costa Mesa, Calif.
[22] Filed: Feb. 10, 1971
[21] Appl. No.: 114,216

Related U.S. Application Data

[62] Division of Ser. No. 874,449, Nov. 6, 1969, Pat. No. 3,592,223.

[52] U.S. Cl..........................137/512.3, 137/513.3, 137/489
[51] Int. Cl. .....................................................G05d 16/00
[58] Field of Search ...................137/512.3, 513.3, 488, 489, 137/489.5, 493.8, 245

[56] References Cited

UNITED STATES PATENTS 2,991,796  7/1961  Griswold................................137/489
3,592,223  7/1971  Reese....................................137/489

Primary Examiner—Samuel B. Rothberg
Assistant Examiner—William H. Wright
Attorney—Gausewitz, Carr & Rothenberg

[57] ABSTRACT

The valve system comprises a main valve including a diaphragm-operated poppet separating an inlet side from an outlet side, a pilot valve for opening and closing the main valve in response to a predetermined pressure or flow condition, and a restrictor (for example, the inlet nozzle of an ejector) coupled to pass fluid from the inlet side to a flow stabilizer and to the pilot valve. The flow stabilizer is connected between the ejector and a diaphragm chamber in the main valve. The stabilizer passes fluid from the ejector to the diaphragm chamber, and at other times from the diaphragm chamber to the ejector, at a restricted rate for slowly opening and closing the main valve in response to slow or small changes in the demand, and at much faster rates for rapidly opening and closing the main valve in response to sudden and substantial changes in the demand.

9 Claims, 5 Drawing Figures

INVENTOR.
JAMES R. REESE
BY
ATTORNEYS.

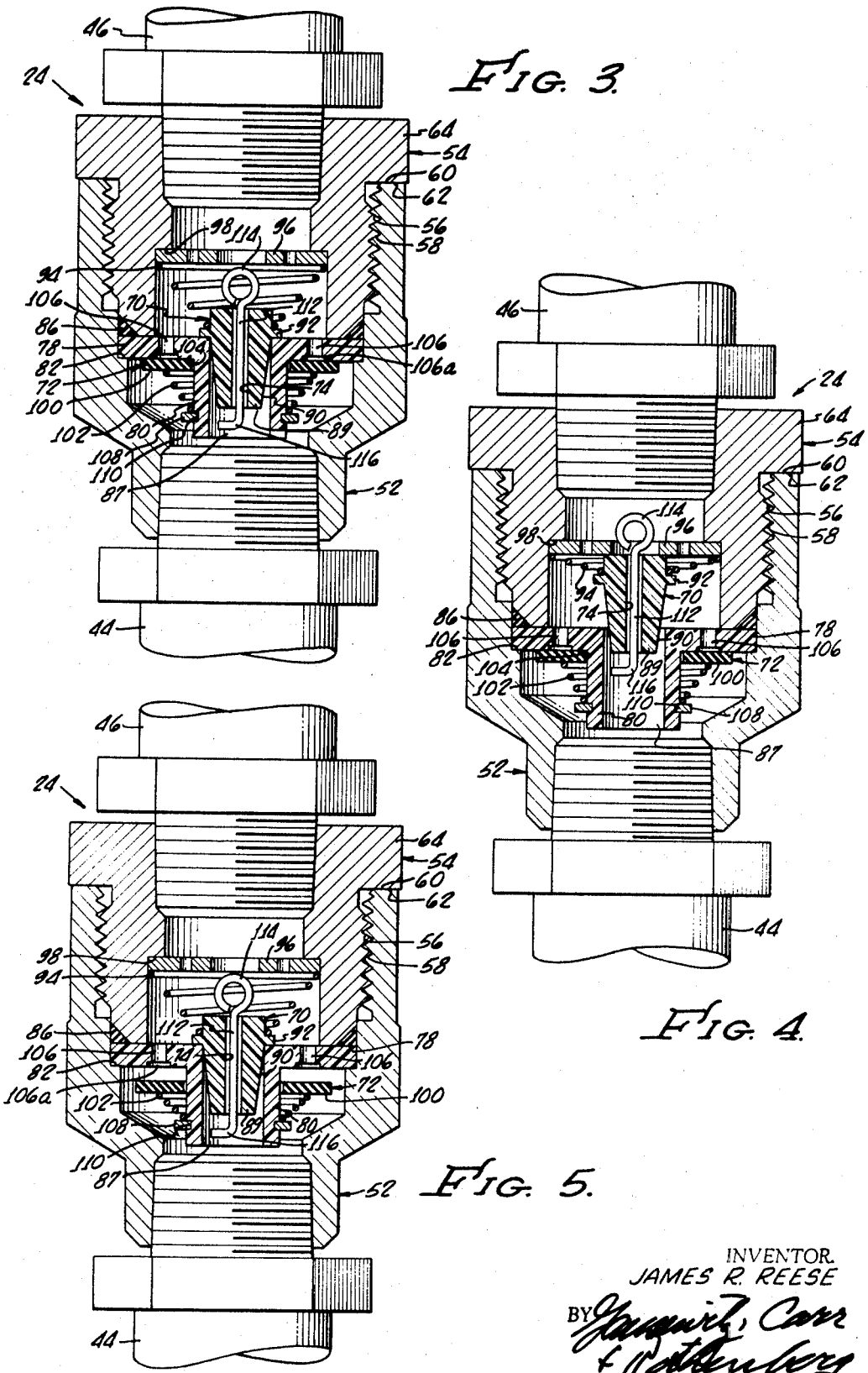

FLOW STABILIZER FOR PILOT-OPERATED MODULATING VALVE SYSTEM

REFERENCE TO RELATED APPLICATION:

This is a division of my copending patent application Ser. No. 874,449, filed Nov. 6, 1969, now U.S. Pat. No. 3,592,223 for a Pilot-Operated Modulating Valve System, and Flow Stabilizer Incorporated Therein.

BACKGROUND OF THE INVENTION

1. Field of the Invention

This invention relates generally to improvements in pilot-operated modulating valve systems, and relates more specifically to an automatically operable stabilizing element for stabilizing the operation of a pressure-reducing valve. Although the invention is primarily described herein relative to pressure-reducing valve systems, it may also be incorporated in relief valve systems and flow-control systems. All of such types of systems (pressure-reducing, relief, and flow-control) may be referred to as "modulating," since the movable part of the main valve may move substantially constantly in order to effect control of pressure, or of rate of flow. The valve systems are employed primarily relative to the control of liquids, such as water, liquid fuels, etc.

2. Description of the Prior Art

When prior-art pilot-operated pressure-reducing valve systems were operated at a high differential pressure between the inlet side and the outlet side, and under low demand rate conditions, the valves frequently hunted and chattered. The hunting and chattering conditions were caused by several different factors any one of which is not readily controlled. It has previously been found that restricting the flow into or out of a main valve diaphragm chamber would, under certain conditions, eliminate the hunting and chattering. However, if this flow were too restricted, the main valve could not respond rapidly enough to meet rapid and substantial changes in the demand. Therefore, the downstream pressure would drop excessively below a set pressure when there was a sudden and substantial increase in the demand, and would rise excessively above the set pressure when there was a sudden and substantial decrease in the demand.

Several prior-art valves and valve systems are shown in U.S. Pats. Nos. 2,925,243, 2,991,796 and 3,217,653. Although the valves and valve systems shown and described in the cited patents produced substantial improvements relative to hunting and chattering in many cases, there are large numbers of situations where such prior-art systems do not cure the hunting and chattering. Even in the latter situations, the presently described valves and valve systems effectively prevent hunting and chattering.

SUMMARY OF THE INVENTION

The present pilot-operated valve system, and flow stabilizer incorporated therein, effect highly restricted flow into and out of a main valve diaphragm chamber when there is only a low differential pressure between the diaphragm chamber and the ejector. However, when there is high differential pressure therebetween (caused, for example, by a sudden and substantial change in the demand) a rapid flow takes place through regulating and check valves arranged in parallel relative to each other and also relative to a restricted flow passage. The parallel-related regulating and check valves are oppositely arranged, so that one may open to permit rapid flow into the diaphragm chamber, and the other may open to permit rapid flow out of the diaphragm chamber. One of the regulating and check valves is throttling in nature. Means are provided to prevent clogging of the restricted flow passage.

The above-cited prior-art patents describe valves which were either fast-opening and slow-closing, or were fast-closing and slow-opening. It was thought that relatively slow operation in at least one direction was essential to the minimization of chatter. It has now been discovered that fast operation may be effected in both directions, when the pressure deviations from a predetermined set point are sufficiently sudden and great, with consequent better pressure control while achieving a much greater elimination of hunting and chattering than was previously though possible. It is emphasized, however, that such fast action in both directions only occurs when there are relatively high differential pressures between the diaphragm chamber and the ejector. At all other times the operation is very slow since the regulating and check valves are then spring-pressed to closed positions, under substantial spring pressures, so that all flow is through the restricted passage. In the check valves described in the cited patents, there was only a very light spring pressure such that the check valve normally opened when there was any substantial pressure differential in the check valve-opening direction.

The present valve system incorporates a simple, economical and substantially clog-proof flow stabilizer which operates, when associated with main and pilot valves in a modulating valve system, to achieve optimum pressure control while at the same time preventing chatter with its attendant extreme vibration, noise, wear, pulsations, etc. It is emphasized that, when a diaphragm valve (for example, in a multi-story apartment building) chatters and hunts, the resulting vibrations shake pipes for hundreds of feet, and may be heard throughout large portions of the surrounding area.

BRIEF DESCRIPTION OF THE DRAWINGS

FIG. 3 is a cross-sectional view of the flow stabilizer or regulator, illustrating the two check valves therein in closed positions assumed in response to slow, small or no changes in the fluid demand;

FIG. 4 is a corresponding view but illustrating the poppet and throttling check valve in its open position, which is assumed when there is a major and sudden increase in the demand; and FIG. 5 is a corresponding view but showing the disc or ring check valve in open position, which occurs when there is a major and sudden decrease in the demand.

DETAILED DESCRIPTION OF AN EMBODIMENT OF THE INVENTION

Figure 2:
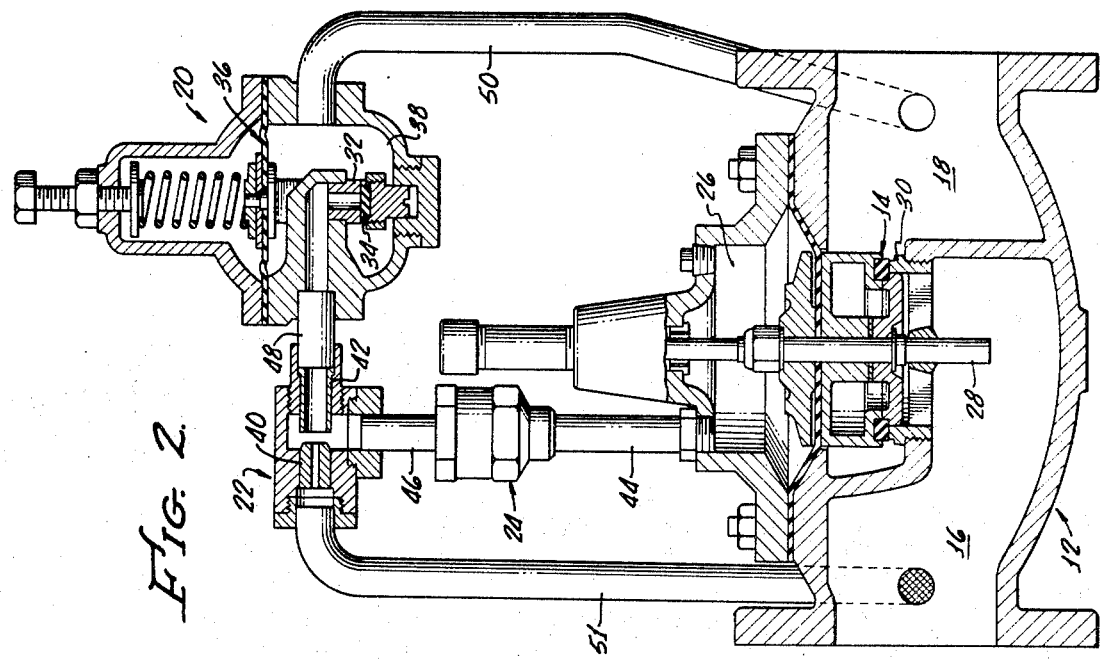
FIG. 2 illustrates the system in its condition responsive to little or no fluid demand at the downstream side of the main valve.
Figure 1:
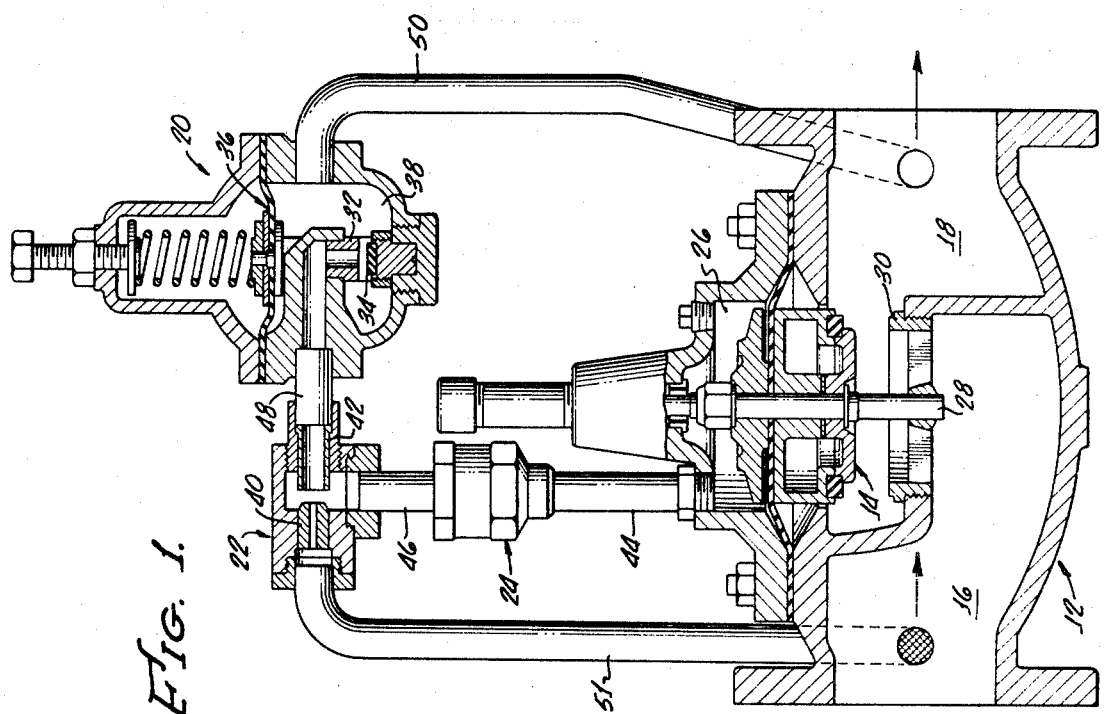
FIG. 1 illustrates, primarily in cross-section, a pilot-operated pressure-reducing valve system including a main pressure-reducing valve, a pressure-regulating pilot valve, an ejector, and a flow stabilizer, the system being shown in its condition responsive to high fluid demand at the downstream (outlet) side of the main valve.

Referring to the drawings, FIGS. 1 and 2 illustrate a main valve 12 (connected as a pressure reducer) which transmits fluid (normally, liquid) in the direction of the arrow (FIG. 1). A diaphragm-operated poppet assembly 14 separates an inlet chamber 16 of the main valve from an outlet chamber 18 thereof. A pressure-regulating pilot valve 20, which is connected to the outlet chamber 18 opens and closes when downstream fluid pressure falls below and rises above a predetermined pressure level (set point). An ejector 22 is connected between the inlet chamber 16 and the other side of pilot valve 20. A flow stabilizer or regulator 24 transmits fluid from the ejector to a diaphragm chamber 26 in the main valve, or from such diaphragm chamber back to the ejector, depending upon the pressure conditions in the system.

If the poppet assembly 14 is initially in the open position illustrated in FIG. 1 and there is a decrease in demand, the fluid pressure in the outlet chamber 18 will rise thereby closing the pilot valve 20. With pilot valve 20 closed, fluid from the inlet chamber 16 is directed through the ejector 22 and flow stabilizer 24 into the diaphragm chamber 26. As a result, the poppet assembly 14 closes toward the position illustrated in FIG. 2.

Conversely, if the poppet assembly 14 is initially in the position illustrated in FIG. 2 and there is an increase in demand, the fluid pressure in the outlet chamber 18 decreases and causes the pilot valve 20 to open. With pilot valve 20 open, fluid from the diaphragm chamber 26 is drained through the flow stabilizer 24 to the ejector 22 where it is combined with fluid from the inlet chamber 16 and transmitted through pilot valve 20 to outlet chamber 18. Such drainage of fluid from chamber 26 causes poppet assembly 14 to open, in response to the fluid pressure in the underside thereof.

Under numerous operating conditions and demands, the poppet assembly 14 will be in positions somewhere between those illustrated in FIG. 1 and FIG. 2.

As will be explained in more detail subsequently, the flow stabilizer 24 transmits fluid between the diaphragm chamber 26 and the ejector 22 at a very low rate when the change in fluid demand on the downstream side of the main valve 12 does not exceed both a predetermined amount and a predetermined rate. If, however, the change in demand exceeds both a predetermined amount and a predetermined rate, the flow stabilizer 24 transmits fluid between the diaphragm chamber and the ejector 22 at much higher rates, thereby enabling the poppet assembly 14 to open and/or close as rapidly as necessary to maintain the desired downstream pressure.

The present pilot-operated valve system may incorporate various standard main valves, pilot valves, restrictors or ejectors, etc. The valves may be of the diaphragm type or of other suitable types (for example, piston or bellows). The illustrated main valve 12, pilot valve 20 and ejector 22 are exemplary of elements which may be employed. Such exemplary elements are substantially identical to corresponding elements described in detail in the above-cited U.S. Pat. No. 2,991,796 (and which is incorporated by reference herein as though set forth in full). Therefore, such elements will be indicated only briefly. There will then be described in detail the critically important flow stabilizer 24 which cooperates in a surprising manner with the standard elements of the system, to thus eliminate hunting and chatter while attaining relatively precise control of pressure.

As described in detail in the U.S. Pat. No. 2,991,796, the poppet assembly 14 of main valve 12 (FIGS. 1 and 2) incorporates a stem 28 which slides upwardly and downwardly in suitable stem guides. When the main valve is in the fully open position shown in FIG. 1, the poppet is spaced far above the associated valve seat 30. The valve is then fully open to permit free flow from inlet chamber 16 to outlet chamber 18. The valve is, as indicated above, in such fully open position when the pressure in diaphragm chamber 26 is low. When the pressure in chamber 26 is high, poppet assembly 14 moves downwardly to the seated position shown in FIG. 2, thus blocking flow through the valve.

The pressure-regulating pilot valve 20 (as described in U.S. Pat. No. 2,991,796) includes a valve seat 32 adapted to be engaged by a poppet 34. Such poppet is connected by a suitable yoke to a spring-pressed diaphragm assembly 36 adapted to bias the poppet toward open position when the pressure in the outlet chamber 38 of the pilot valve decreases. The chamber on the upper side of diaphragm assembly 36 may be open to the ambient atmosphere.

Ejector 22 (as described in U.S. Pat. No. 2,991,796) incorporates a small-diameter (restricting) inlet nozzle 40 which is axially aligned with a larger-diameter outlet nozzle 42. The ejector aids in effecting discharge of liquid from diaphragm chamber 26 of the main valve.

The inner diameter of inlet nozzle 40 of the ejector is smaller than the inner diameter of valve seat 32 of pilot valve 20. Therefore, when pilot valve 20 is opened sufficiently there will be (as above indicated) flow to the pilot valve not only from nozzle 40 but from diaphragm chamber 26 to drain the latter. Such drainage flow is from chamber 26 through a pipe 44 to flow stabilizer 24, thence from stabilizer 24 through a pipe 46 to the chamber formed in ejector 22 between the nozzles 40 and 42 thereof. The drainage path continues through nozzle 42 and through a conduit 48 which is connected to the inlet of pilot valve 20, thence through valve seat 32 to chamber 38, and thence through a pipe 50 which connects the pilot valve to the outlet chamber 18 of main valve 12.

When pilot valve 20 is closed sufficiently, the indicated drainage path from diaphragm chamber 26 no longer exists. Instead, liquid is supplied from main valve inlet chamber 16 through a pipe 51 to restrictor 40, and thence through pipes 46 and 44, and stabilizer 24, to the diaphragm chamber 26.

If the flow stabilizer 24 were not present, the flow between diaphragm chamber 26 and ejector 22 would be virtually unrestricted. Accordingly, the main valve 12 would, under some conditions, go into the indicated pulsating, chattering and hunting condition. Such condition is effectively cured by the stabilizer 24 but without permitting the pressure on the outlet side of valve 12 to deviate excessively from the predetermined set point.

The ejector 22 may be omitted and replaced by a suitable restrictor which permits drainage from diaphragm chamber 26 when pilot valve 20 is sufficiently open. Were it not for the presence of some restrictor, such as 40, full opening of pilot valve 20 would only result in the supplying of larger amounts of liquid to the pilot valve from inlet 16, without permitting any drainage from diaphragm chamber 26. The restrictor need not be localized, but could be effected by making pipe 51 sufficiently small in diameter. Suitable screen means are normally associated with the restrictor, for example as described in the U.S. Pat. No. 2,991,796.

THE FLOW STABILIZER OR REGULATOR 24

The flow stabilizer 24 includes a first and generally cup-shaped housing 52 and a second and generally plug-shaped housing 54 each having a fluid flow passage formed axially therethrough. Such housings are threaded together by means of internal threads 56 and external threads 58. The plug-shaped housing 54 is threaded into cup-shaped housing 52 until one end wall 60 of housing 52 abuts a shoulder 62 of a flange 64 formed at the adjacent end of housing 54.

The passage formed axially through housing 54 is aligned with the passage formed axially through housing 52 to provide a path for fluid flow back and forth between ejector 22 and main valve 12. The outermost end of the passage in housing 54 receives a suitable fitting which couples one end of pipe or conduit 46 to the flow regulator 24. Correspondingly, the outer-most end of the passage in housing 52 receives a suitable fitting which connects one end of pipe or conduit 44 to the flow regulator.

A compound valve assembly is mounted within the two housings 52 and 54 and includes a first regulating and check valve 70 and a second regulating and check valve 72. The first valve 70 is responsive to rapid and substantial increases in the fluid demand at the outlet chamber 18 of the main valve 12, and when open (for example, as shown in FIG. 4) allows a greatly increased rate of fluid flow from the diaphragm chamber 26 to ejector 22.

The second valve 72 is responsive to sudden and substantial decreases in the demand at the outlet chamber 18. When such a decrease occurs, valve 72 opens (for example, to the position illustrated in FIG. 5) and allows a greatly increased fluid flow from ejector 22 into the diaphragm chamber 26, thus quickly closing the main valve.

In addition to the two regulating and check valves, a continuously open but greatly restricted passage 74 is formed through the first valve assembly 70. This provides a restricted bidirectional flow between the diaphragm chamber 26 and ejector 22 at all times including during relatively slow or small changes in the demand.

It is pointed out that the regulating and check valve 70 is arranged in parallel with valve 72, and that both of such valves are in parallel with the restricting passage 74. The valves 70 and 72 are oppositely oriented relative to each other. Thus, prior to the time valve 70 opens, all upward flow through stabilizer 24 is via the highly restricted passage 74. Prior to the time valve 72 opens, all downward flow is again through such restricted passage.

To describe the compound valve assembly more specifically, it includes a tubular valve seat member 80 (formed, for example, of Delrin plastic) having a radial flange or check plate 78 at the upper end thereof. The periphery of flange 78 is mounted on a shoulder 82 formed in the passage of housing 52, being clamped against such shoulder by the lower end of housing 54. An O-ring or other seal 86 is mounted in an annular space formed between the upper face of flange 78 and a beveled edge of housing 54. The bore or passage 87 which extends through valve seat member 80 operates as the valve port of the first regulating and check valve 70.

A poppet body 89 (also forming part of valve 70), having an elongated tapered (frustoconical) valve face 90 of decreasing diameter in the downward direction, is reciprocably mounted in the bore 87. Such tapered valve face may be termed a "throttling portion." A flange-like valve head (poppet flange) 92 is formed around the poppet body 89 and is normally biased against the upper valve-seat face portion of flange 78 (as shown in FIGS. 3 and 5) by means of a regulating spring 94.

Such regulating spring 94 is illustrated to be a conical volute compression spring disposed above flange 78 and having its base, or upper end, seated upon an apertured stop plate or disc 96 and its lower end mounted around a boss portion of the poppet body 89 on valve head 92. The spring force also maintains stop plate 96 engaged with a shoulder 98 formed in the passage through housing 54.

The second regulating and check valve 72, which forms the remainder of the compound valve assembly, comprises a flat disc or ring 100 (formed, for example, of rubber) which is biased against the lower face of flange or check plate 78. The bias is effected by a regulating spring 102, disposed below flange 78, the relationship being such that the direction of biasing is opposite to that of the first valve 70. The disc 100 has an aperture 104 formed centrally therethrough, and which loosely receives the seat member 80.

The regulating spring 102 is a conical volute compression spring which has its base (larger-diameter upper end) seated on the lower face of disc or ring 100. The lower end of spring 102 is mounted around seat member 80 and seats against a split ring 108 which is mounted in an annular groove 110 in such member.

The upper face of disc or ring 100 is seated beneath a plurality of valve ports 106 formed through flange 78. In the present embodiment of the invention, there are six of these valve ports 106, equally spaced about the flange 78 at the same radial distance from the axis thereof. The ports 106 communicate at their lower ends with a single continuous annular groove 106a the center of which is at the axis of member 80, such groove being covered by ring 100 when the latter is in its closed position (FIGS. 3 and 4) seated on the underside of flange 78.

The above-mentioned restricted passage 74 has a cleaning wire 112 inserted therethrough, and which is of substantially smaller diameter than that of the passage. An eye 114 is formed at the other end thereof. The distance between eye 114 and the arm 116 is sufficient to allow axial movement of the cleaning wire 112 in the passage 74, while its small diameter allows for lateral movement thereof. Fluid flow back and forth between the ejector 22 and the diaphragm chamber 26 therefore causes movement of the cleaning wire 112, so that the restricting passage 74 is kept clean and open.

As the poppet body 89 moves to the open position illustrated in FIG. 4, the eye 114 is inserted through a central aperture in stop plate 96, which stop plate then serves as a seat for the poppet body and prevents excessive shifting thereof out of passage 87. A plurality of circumferentially spaced ports through plate 96 then permit continued flow of fluid therethrough.

DESCRIPTION OF EXEMPLARY PORT SIZES, SPRING SETTINGS, ETC.

In accordance with a specific example of the present flow stabilizer 24, and which is given by way of illustration only and not limitation, the diameter of the restricted flow passage 74 may be 0.043 inch in one embodiment, and 0.0595 inch in another embodiment. The diameter of the wire 112 may be 0.032 inch.

Relative to the regulating and check valve 70, the maximum diameter of the poppet body 89 may be 0.250 inch, whereas that of the poppet flange 92 may be 0.38 inch. Such poppet body is preferably formed of plastic, for example Delrin. The taper angle of the frustoconical exterior surface 90 of the poppet body may be 6 degrees.

The spring 94 may exert a pressure of ½ pound on the poppet body 89 when the latter is in closed position. The spring rate may be 0.594 pounds per inch. The diameter of the passage or bore 87 may be 0.250 inch.

The area of passage 87 in the specified example is approximately 0.05 square inches. Since the spring 94 presses the poppet downwardly at a pressure of approximately ½ pound, it follows that the pressure differential across the valve 70 must be, in the specified example, in excess of 10 pounds per square inch before such regulating and check valve 70 will open.

Relative to the second regulating and check valve 72, each of the apertures 106 may have a diameter of 0.062 inch. The spring 102 may exert a force of 0.78 pounds when the valve 72 is closed, and may have a spring rate of 1.09 pounds per inch. The area of groove 106a may be 0.26 square inches. Therefore, the fluid pressure differential required to open the valve 72 is approximately 3.0 pounds in the illustration.

From the above specific example, it may be seen that the first and second valves 70 and 72 operate not only as check valves but also as regulating valves. This is to say, they do not open until the fluid pressure differential thereacross achieves specified and relatively high values. This is to be contrasted with the prior-art constructions such as are described in the above-cited patents. In such constructions, the check valves incorporated extremely light springs such that the fluid pressure differential of only an ounce or two would open the valve. The purpose of such light springs was merely to effect seating of the valves — not to provide any pressure-regulating function.

The flow regulator or stabilizer 24 set forth in the above specific example is particularly intended for use with main valves 12 having (for example) seat diameters 30 on the order of about 1 inch to about 8 inches. Larger or smaller seat diameters may be accommodated by stabilizers 24 having the same or somewhat different dimensions than those stated.

OPERATION, AND FURTHER DESCRIPTION

Let it be assumed that the pressure-reducing valve system described above is initially in the position shown in FIG. 1, the main valve 12 being open. As the downstream pressure rises, it acts on the diaphragm assembly 36 of pilot valve 20 to overcome the spring pressure therein and cause closing of the pilot 20, for example to the position of FIG. 2. Accordingly, fluid from inlet chamber 16 passes through the strainer (not shown) to restrictor 40, and thence through pipes 44 and 46 and stabilizer 24 to diaphragm chamber 26. Pressure in the latter chamber then builds up and causes the poppet assembly 14 to shift downwardly to the FIG. 2 position whereupon the main valve is closed.

The pressure on the discharge or outlet side (outlet chamber 18) of main valve 12 accordingly drops, which operates through pipe 50 to reduce the pressure in pilot valve chamber 38 until the spring in the pilot valve causes such valve to open. The above-indicated flow path is therefore created from chamber 16 through pipe 51, ejector 22, pilot 20 and pipe 50 to outlet chamber 18. Also, because of the small diameter of restrictor 40, fluid drains from diaphragm chamber 26 through pipes 46 and 44 and stabilizer 24 to the pilot and thus through pipe 50 to outlet chamber 18. This causes the main valve 12 to open.

When the rate of change in fluid demand, and the amount of change in fluid demand, are not excessive, the pressure differential developed across stabilizer or regulator 24 is less than that required to open either of the regulating and check valves 70 and 72 therein. Accordingly, all flow into and out of the diaphragm chamber 26 occurs through the highly restricted passage 74. The operation of the main valve 12 is therefore caused to be gradual, both in the opening direction and the closing direction, and there are no pulsations, or any chatter or hunting.

There will next be described the condition which occurs when the rate and amount of pressure drop in outlet chamber 18 are so great that the regulating and check valve 70 in stabilizer 24 opens. As the pressure in such outlet chamber starts to drop, the spring in pilot valve 20 causes such pilot to open and create the above-specified path which is such that diaphragm chamber 26 starts to drain and initiate opening of the main valve 12. However, if the rate of opening of the main valve is not sufficiently fast to prevent further dropping of the pressure in outlet chamber 18, as occurs when the rate and amount of increase in demand are great, the pressure differential built up across flow stabilizer or regulator 24 will be sufficiently large to open the regulating and check valve 70 therein. This creates a much greater (larger diameter) flow path for the liquid flowing out of diaphragm chamber 26, so that the main valve 12 may open at a much faster rate. Accordingly, the outlet pressure in chamber 18 is brought up to the predetermined set point (determined by various factors including the setting of the spring in pilot valve 20), at which point the pilot valve 20 starts to throttle, thereby decreasing the pressure drop across the flow stabilizer or regulator 24. As soon as the pressure drop across stabilizer 24 diminishes sufficiently, the regulating and check valve 70 therein closes so that all flow relative to diaphragm chamber 26 is again through the restricted passage 74.

Because of the tapering of the poppet body 89 (surface 90) in valve 70, such valve is throttling in nature. Therefore, the rate of opening of the main valve 12 is somewhat less fast than the rate of closing thereof in response to the valves 70 and 72 (it being emphasized that, when neither of the valves 70 and 72 is open, the rate of opening and closing of the main valve 12 is generally the same since all flow is through passage 74). It is to be noted, however, that the rate of opening and closing of the main valve in response to operation of valves 70 and 72 is fast in comparison to the slow-operating direction described in the above-cited patents.

Let it next be assumed that the elements downstream from main valve 12 suddenly close, resulting in a very rapid and substantial rise in pressure in outlet chamber 18. The pilot 20 than closes in response to the increased pressure in chambers 18 and 38, causing liquid from inlet chamber 16 to pass through restrictor 40 and stabilizer 24 to diaphragm chamber 26. Because it was assumed that the rise in pressure in chamber 18 was very rapid and substantial, the flow through the restricted passage 74 in stabilizer 24 is not rapid enough to permit an increase in pressure in chamber 26 sufficient to cause adequately rapid closing of valve 12. Assuming that the pilot 20 is closed completely, the full capacity of restrictor 40 is directed to the upstream side of stabilizer 24, which builds up the pressure across such stabilizer 24 to a value sufficient to open the regulating and check valve 72 and thereby greatly increase the rate of injection of liquid into diaphragm chamber 26. The main valve 12 then quickly closes or substantially closes, whereupon the downstream pressure in outlet chamber 18 reaches the specified predetermined set point. The regulating and check valve 72 then seats and all flow through stabilizer 24 is again via the restricted passage 74.

In summary, therefore, the main valve 12 operates slowly at all times when the rate or amount of change in demand on outlet chamber 18 is not great, thus eliminating chatter, etc. However, when the demand changes rapidly and greatly in either direction, the corresponding regulating and check valve 70 or 72 permits rapid operation of the main valve 12 in the necessary direction. The demand may change drastically in both directions in rapid sequence, so that the main valve 12 will first rapidly open and then rapidly close. Despite such fast operation, there is again no chattering, pulsations, etc.

In a typical pressure-reducing application, the pressure in inlet chamber 16 may be 100 psi, and the predetermined pressure (set point) in outlet chamber 18 may be 50 psi. The relationships are then caused to be such that neither stabilizer valve 70 or 72 will open unless the pressure in outlet chamber 18 changes rapidly a substantial amount above or below the set pressure of 50 psi. Such "substantial amount" is on the order of 1 or more (several) pounds, and may be (for example) 5 psi. Thus, in the stated example, neither valve 70 or 72 will open if the pressure in outlet chamber 18 is between 45 psi and 55 psi.

Stated otherwise, neither of valves 70 or 72 will open, despite a very sudden change in pressure, if the amount of pressure change in outlet chamber 18 does not exceed the "substantial amount." The regulating springs 94 and 102 in the stabilizer prevent opening of valves 70 and 72 therein at all times except when the pressure change in outlet chamber 18 is both sudden and substantial.

If the pressure changes at a slow rate in outlet chamber 18, the pilot valve 20 and the restricted passage 74 are operative to maintain the downstream pressure very near the 50 psi (or other) set point.

Correspondingly, the pressure drop (in either direction) across stabilizer 24 must be substantial, or neither valve 70 or 72 therein will open. Such "substantial" pressure drop is again on the order of 1 or more (several) pounds, and was stated above (in the specific example) to be 10 psi or 3.0 psi.

Although the above description relates primarily to a pressure-reducing valve system, the flow regulator or stabilizer 24 may (as indicated above) also be employed in relief valve systems and flow-control valve systems. Relative to relief valve systems, for example, the orientation of the flow regulator may be reversed from that illustrated, so that the valve 72 then controls opening of valve 12, and the valve 70 controls closing of valve 12. In a relief valve system, the pilot valve is connected to respond to the upstream pressure, as taught relative to FIGS. 3 and 4 of the U.S. Pat. No. 2,991,796 which was incorporated by reference herein.

Relative to flow-control valve systems, the pilot valve is adapted to respond to the rate of flow (gallons per minute). This may be done, for example, by providing a predetermined orifice on the upstream or downstream side of main valve 12, and sensing the pressure on both sides of such orifice. One side of the orifice may be connected to one side of the diaphragm in the pilot valve, whereas the other side of the orifice may be connected to the other side of such pilot diaphragm.

The diaphragm chamber 26 and associated diaphragm elements in valve 12 (or equivalents) may be termed an "operating chamber" or "operating means" for the main valve. Such operating chamber or operating means opens and closes the main valve in response to injection or drainage of fluid. The operating chamber or means need not be integrally associated with the main valve.

The foregoing detailed description is to be clearly understood as given by way of illustration and example only, the spirit and scope of this invention being limited solely by the appended claims.

What is claimed is:

1. A fluid-flow stabilizing and regulating device for use in a modulating valve system, comprising:
 first valve means responsive to a predetermined pressure differential across said device for increasing the fluid flow in a first direction therethrough,
 second valve means arranged in parallel with said first valve means and responsive to a predetermined pressure differential across said device for increasing the fluid flow in a second direction therethrough, said second direction being opposite to said first direction, and means to form a continuously-open restricted passage in parallel with both of said valve means for continuously transmitting fluid in either said first direction or said said second direction through said device.

2. The invention as claimed in claim 1, in which each of said first and second valve means is a normally-closed spring-pressed regulating and check valve, and in which the spring settings of said regulating and check valves are such that fluid flow through said device frequently occurs only through said continuously-open restricted passage.

3. The invention as claimed in claim 1, in which said restricted passage has a cross-sectional area substantially smaller than the flow area of either said first valve means or said second valve means when said valve means are in open condition.

4. The invention as claimed in claim 1, in which said device includes a housing having a large fluid-flow passage therethrough, and means to form a check plate across said passage, said check plate having a first valve port therein and also having second valve port means therein, in which said first valve means includes a poppet member mounted on one side of said check plate and associated with said first valve port to open and close the same, said poppet member being spring pressed toward closed position, and in which said second valve means includes a member mounted on the other side of said check plate and spring biased toward closed position over said second valve port means.

5. The invention as claimed in claim 4, in which said poppet member is said means to form a continuously-open restricted passage.

6. The invention as claimed in claim 5, in which a wire is movably mounted longitudinally of said flow passage to maintain the same clear of obstructions.

7. The invention as claimed in claim 4, in which said poppet member has a tapered face whereby to provide a throttling action upon opening and closing of said poppet member against the bias of the spring therefor.

8. The invention as claimed in claim 1, in which said device includes a housing having a large fluid-flow passage therethrough, in which a check plate is provided across said passage, said check plate having a central relatively large port therethrough, said check plate also having a plurality of spaced ports formed therethrough radially-outwardly of said central port, in which said first valve means includes a poppet mounted on one side of said check plate to open and close said central port, in which a spring is provided to bias said poppet toward closed position blocking flow through said port, in which said second valve means includes a ring mounted on the other side of said check plate to close said spaced ports therein, in which a spring is provided to bias said ring toward closed position blocking flow of fluid through said ports, and in which said means to form a continuously-open restricted passage includes a small-diameter bore through said poppet.

9. The invention as claimed in claim 8, in which a tubular element extends axially from said check plate in registry with said central port therethrough, in which said poppet has a tapered portion extending into said central port and into said tubular element, and in which said ring is mounted around said tubular element.

* * * * *

PO-1050
(5/69)

UNITED STATES PATENT OFFICE
CERTIFICATE OF CORRECTION

Patent No. 3,669,143          Dated June 13, 1972

Inventor(s) James R. Reese

It is certified that error appears in the above-identified patent and that said Letters Patent are hereby corrected as shown below:

On the first printed page of the above-identified patent, following "[73] Assignee:", cancel "Cal-Val Co." and substitute --- Cla-Val Co. ---.

Signed and sealed this 3rd day of April 1973.

(SEAL)
Attest:

EDWARD M. FLETCHER, JR.          ROBERT GOTTSCHALK
Attesting Officer          Commissioner of Patents